United States Patent [19]

Hessemer et al.

[11] E Re. 29,266

[45] Reissued June 14, 1977

[54] MOTOR CONTROLLED LAMP

[75] Inventors: Lawrence E. Hessemer; Richard P. Manning, both of Jackson, Mich.; Harry G. Sparks, deceased, late of Jackson, Mich., by Helen W. Sparks, administratrix; Walter H. Powers, Jackson, Mich.

[73] Assignee: S-C Liquidating Corporation, Jackson, Mich.

[22] Filed: Jan. 24, 1974

[21] Appl. No.: 436,147

Related U.S. Patent Documents

Reissue of:

[64] Patent No.: 3,644,728
Issued: Feb. 22, 1972
Appl. No.: 848,895
Filed: Aug. 11, 1969

[52] U.S. Cl. ..... 240/61.9; 240/41.61
[51] Int. Cl.[2] ..... B60Q 1/06
[58] Field of Search ..... 240/61.9, 44, 44.2, 240/61, 61.11, 62 R, 62.4, 41.61

[56] References Cited

UNITED STATES PATENTS

| | | | |
|---|---|---|---|
| 1,257,141 | 2/1918 | Snowdon | 240/61.9 |
| 1,641,167 | 9/1927 | Hannig | 240/61.9 |
| 1,827,797 | 10/1931 | Muller | 240/61.9 |
| 2,754,411 | 7/1956 | Dohrmann | 240/61.9 |
| 2,859,331 | 11/1958 | Grimes | 240/61.9 X |
| 2,911,519 | 11/1959 | Phillips et al. | 240/61.9 |
| 3,075,073 | 1/1963 | Hilderbrecht | 240/61.13 |
| 3,259,738 | 7/1966 | Strother | 240/61.9 |
| 3,457,733 | 7/1969 | Bougerter et al. | 64/30 |

FOREIGN PATENTS OR APPLICATIONS

| | | | |
|---|---|---|---|
| 1,028,287 | 5/1966 | United Kingdom | 240/61.9 |

*Primary Examiner*—Donald A. Griffin
*Attorney, Agent, or Firm*—Beaman & Beaman

[57] ABSTRACT

An electric motor-controlled lamp capable of being controlled from a location remote from the lamp utilizing a pair of reversible electric motors mounted wholly within the lamp housing wherein the lamp may be pivoted by the motors about both horizontal and vertical axes by energizing the electric motors. The lamp includes flood and spotlight filaments, the spotlight filament switch including resistor means connected in series with the electric drive motors to automatically reduce the rate of lamp adjustment when the spotlight filament is utilized.

10 Claims, 10 Drawing Figures

INVENTORS
Lawrence E. Hessemer
Richard P. Manning
Harry G. Sparks
Walter A. Powers
By Beaman & Beaman
ATTORNEY Lawrence E. Hessemer
Richard O. Manning
Harry G. Sparks
Walter H. Powers
INVENTORS
By Beaman & Beaman
ATTORNEYS Lawrence E. Hessemer
Richard G. Manning
Harry G. Sparks
Walter H. Palmer
INVENTORS
By Beaman & Beaman
ATTORNEYS

MOTOR CONTROLLED LAMP

Matter enclosed in heavy brackets [ ] appears in the original patent but forms no part of this reissue specification; matter printed in italics indicates the additions made by reissue.

BACKGROUND OF THE INVENTION

The invention pertains to the field of electrically operated remote-controlled lamps capable of being adjusted in a three-dimensional pattern.

A number of applications exist where it is desirable to mount an adjustable lamp, such as a floodlight or spotlight, upon a vehicle, boat or other installation whereby the lamp may be remotely operated such that the light beam will sweep both horizontally and vertically. A number of manual devices are available to produce this type of adjustment, and such devices usually employ control handles and shafts, Boden wires, and other cable-type connections where remote operation of the lamp is desired.

Spotlights for automobiles, for instance, have long been available wherein the control mechanism for the spotlight passes through a windshield pillar or wall of the vehicle passenger compartment and protrudes into the compartment wherein the control handle is accessible to the occupant. This type of remote-controlled lamp is no longer permissable under automobile safety regulations due to the protrusion of the handle into the passenger compartment. Also, it is often desired to place an adjustable lamp at a location on a service vehicle remote from the cab, or at the bow or stern of a boat, and with this type of installation an electrically controlled lamp is usually required in that other types of lamp control are difficult to install when the control apparatus is spaced more than a few feet from the lamp itself.

Those electrically operated lamps presently available are of a relatively large size and are expensive to manufacture and assemble, resulting in this type of lamp being used only in those installations wherein cost is not of prime significance. Many electrically powered remotely operated lamps use a yoke-type support for the lamp housing, and the most common construction is to place the mechanism for producing horizontal rotation in the base of the lamp pedestal, while the mechanism for producing the vertical adjustment is mounted in the lamp housing. This type of construction results in a bulky lamp base, and a complicated and costly assembly. Additionally, conductor rings and brushes are often used to transmit electricity to the lamp housing, and this type of electrical transmission is not dependable due to the electrical contacts becoming soiled and nonconducting.

Another disadvantage with available electrically controlled lamps lies in their susceptibility to damage due to the lamp being inadvertently struck or turned manually, which often results in rendering the lamp drive mechanism inoperative. For instance, electric-powered lamps mounted upon vehicle roofs and the like are subject to being brushed by branches and such externally applied forces to the lamp housing can strip gears, shear pins or otherwise damage the drive mechanism.

Electrically driven lamps of previous construction are also susceptible to damage from vibration, particularly when mounted upon boats and motor vehicles, and vibration forces imposed upon the lamp while being operated can become objectionable particularly when using a spotlight filament.

Prior art illustrating electric motor devices for adjusting lamps is shown in U.S. Pat. Nos. 1,611,267; 2,859,331 and 3,075,073. Disadvantages of the above type to which the devices shown in these patents are subject, are overcome by the construction of the invention.

SUMMARY OF THE INVENTION

The invention pertains to an electrically controlled lamp which is of a concise, streamlined and attractive configuration, the lamp being mounted upon a relatively small pedestal, and the complete drive mechanism for the lamp being entirely located within the lamp housing.

The drive mechanism for the lamp includes a compactly arranged unit mounting two reversible electric motor and speed reduction units in driving engagement with gears having vertical and horizontal axes.

The arrangement of the invention connects the gear having the vertical axis to the lamp support or pedestal, and the gear having the horizontal axis is connected to the lamp housing. Friction clutch means are interposed between the gears and the associated component to which it is "mounted" whereby the lamp housing may be directly manually rotated about either axis upon overcoming the friction connection between a clutch and its associated gear thereby preventing damage to the drive mechanism. Additionally, the presence of the friction clutch mechanism with the drive gears permits the lamp to be manually adjusted by rotating the lamp housing directly, if desired, such as in the event of a power failure.

To produce a smooth motion during operation of the lamp, and to provide additional protection of the drive mechanism against vibrations, friction brake means are utilized with the structure coincident with the vertical and horizontal axes of adjustment. The friction brake means produce a frictional force, which is overcome by the drive mechanism, which is sufficient to absorb vibrations and insure a smooth operating motion. Additionally, the lamp housing is counterbalanced relative to its support member by means of a torsion spring which is substantially concentrically related to the horizontal pivot axis, which compensates for the offcenter weight of the lamp, and minimizes the power requirements during vertical adjustment.

Preferably, the lamp is of the sealed beam type including both floodlight and spotlight filaments. The filaments of the lamp, and the electric motors of the lamp operating unit, are controlled by electric switches, and in order to produce the most accurate control of the light beam when the spotlight filament is being utilized, the electric circuit includes a control for automatically reducing the velocity of the lamp drive mechanism adjustment when the spotlight filament is energized.

Another important feature of the lamp of the invention lies in the utilization of stop means which is related to the vertical axis of adjustment such that the lamp may be rotated in a horizontal plane through more than 360°, prior to reaching the termination of its horizontal limit of travel. Thus, versatility of adjustment is achieved without requiring conductor rings and brushes.

The lamp of the invention may be manufactured, assembled and distributed at less cost than similar types of electrical powered lamps, is more concise in its configuration, and substantially free of the vibration and transmission drive problems which have previously plagued electric motor controlled lamps.

BRIEF DESCRIPTION OF THE DRAWING

The aforementioned objects and advantages of the invention will be appreciated from the following description and accompanying drawings wherein.

DESCRIPTION OF THE PREFERRED EMBODIMENT

Figure 1:
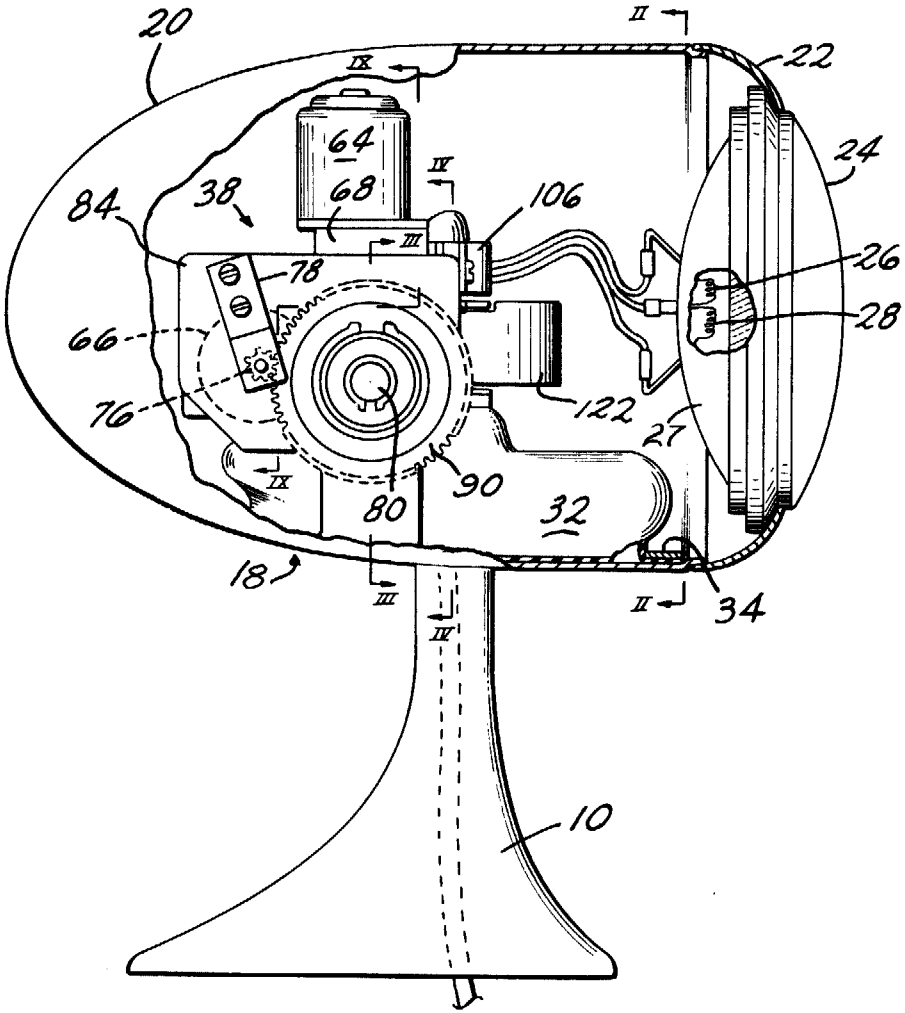
FIG. 1 is a side, elevational view of a lamp constructed in accord with the invention, portions of the housing being broken away for purpose of illustration.

The commercial embodiment of the lamp takes the form shown in the drawings, and includes a streamlined and attractive pedestal 10 which may be mounted upon a supporting surface for the lamp, such as an automobile cab or fender, a boat deck or bridge roof, a house roof, or any other supporting surface. Screw holes are defined in the base of pedestal, not shown, for affixing the pedestal to its support.

The pedestal includes an upwardly extending hollow portion 12 having a cylindrical bore 14 for receiving the tubular shaft 16. The tubular shaft 16 is fixed to the pedestal 10 by a pin, or setscrew in order to prevent relative rotation therebetween. In this manner the lower end of the shaft has access to the interior of the pedestal whereby the power supply and control conductors may pass through the pedestal and shaft into the lamp housing.

The lamp housing 18 is mounted upon the shaft 16 in a manner as will be later described, and the housing is of the streamlined configuration apparent in FIG. 1 which includes a radiused convex portion 20, and a front portion upon which the lamp bezel 22 is mounted for supporting the sealed beam lamp 24. The lamp 24 preferably includes a spotlight filament 26 and a floodlight filament 28 and appropriate terminals extend from the rear of the lamp located within the confines of the housing.

The housing 18 is povided with an elongated opening 30 at the lower portion thereof through which the pedestal portion 12 extends, and this opening is sealed with respect to the interior of the housing by means of a flexible boot 32 of rubber, neoprene or similar material. The boot 32 is held in engagement with the lamp housing by hold down strips 34, FIG. 1, and is sealed with respect to the shaft 16 a snap ring 36 and bushing 37, FIG. 4. The length of the opening 30 is sufficient to permit approximately 80° of adjustment of the housing 18 about its horizontal axis.

The lamp housing support 38 is of a rather complex configuration and is formed of sheet steel plates affixed by screws, welds and other conventional fastening techniques. The configuration of the support 38 is best appreciated from FIGS. 1, 2, 4 and 9, and includes upper and lower plates 40 which are journaled to the tubular shaft 16 by plastic bearings 42, FIG. 4. In this manner the support member is capable of rotating about a vertical axis as defined by the shaft 16.

Figure 4:
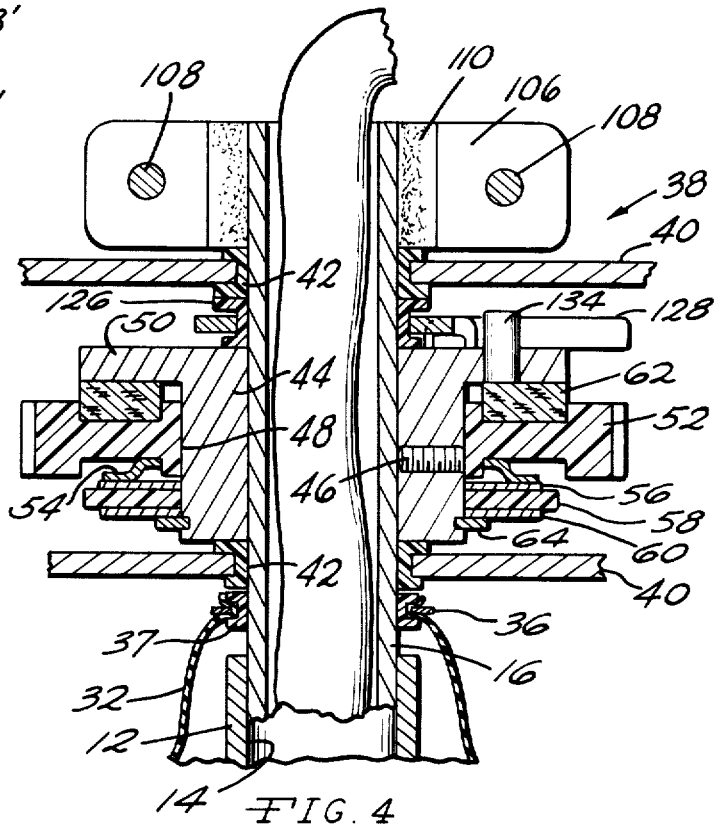
FIG. 4 is an enlarged, diametrical, elevational sectional view taken through the drive gear and support member mounted upon the vertical axis as taken along Section IV—IV of FIG. 1.

A hub 44 is mounted upon the shaft 16 and affixed thereto by a setscrew 46, FIG. 4. The hub 44 includes a cylindrical diameter 48, and a radially extending flange 50. A gear 52, preferably formed of a plastic material such as nylon or Delrin, is mounted upon the hub diameter 48 for relative rotation thereto. The gear includes annular recessed portions defined on opposite sides of the gear, and the lower recess receives an annular spring washer 54 which circumscribes the shaft 16 and engages a washer element 56 in turn engaging a synthetic plastic annular washer 58 which is backed by a metallic washer 60 engaging the split ring 64 received in a groove defined in the hub 44.

An annular friction clutch ring 62, such as of cork or the like, is received within the upper gear annular recess and engages the underside of the flange 50. Due to the axial biasing force imposed upon the gear 52 toward the flange by the annular spring washer 54 a frictional engagement between the gear and the flange is produced. Likewise, a frictional relationship exists between the plastic washer 58 and the associated metallic washers whereby relative rotational movement between the spring washer and the gear is prevented. In this manner the gear 52 is mounted upon the shaft 16 in a firm, yet frictionally releasable relationship. The character of the spring washer 54, and the frictional characteristics of the ring 62 and the flange 50 are such that a rather firm frictional relationship is achieved which is sufficient to rotate the lamp housing under the torque output of the motors yet will permit the housing 18 to be rotated about the vertical axis when the housing is manually grasped and twisted in a horizontal plane without damaging the motor gear train or associated components.

The support 38 supports a pair of reversible electric motors 64 and 66 which are of the DC type, and each motor is mounted upon a speed reduction transmission generally indicated at 68. The motor 64 transmission includes an output pinion gear 70 mounted on output shaft 72, while the motor 66 rotates the output shaft 74 and pinion 76. The transmission drive shafts upon which the pinions are mounted are supported by outboard brackets 78 mounted on support member 38. The motor 64 is mounted such that the output shaft 72 is vertically disposed maintaining engagement of the pinion gear 70 with the gear 52 at the "rear" of the gear as is apparent from FIGS. 7 and 8.

Figure 2:
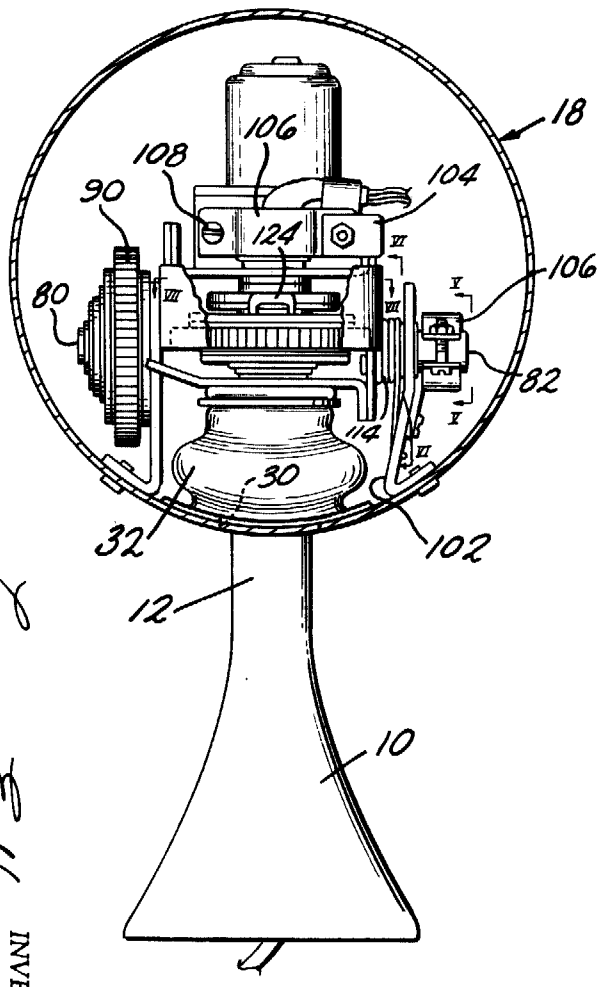
FIG. 2 is an elevational, sectional view of the lamp as taken along Section II—II of FIG. 1.

The housing support 38 also includes a pair of stub shafts 80 and 82, FIG. 2, defining the horizontal axis about which the lamp housing pivots. The stub shaft 80 is mounted upon the support member side plate 84, FIG. 3, and the stub shaft 82 is mounted upon the support side plate 86, FIG. 5.

Figure 3:
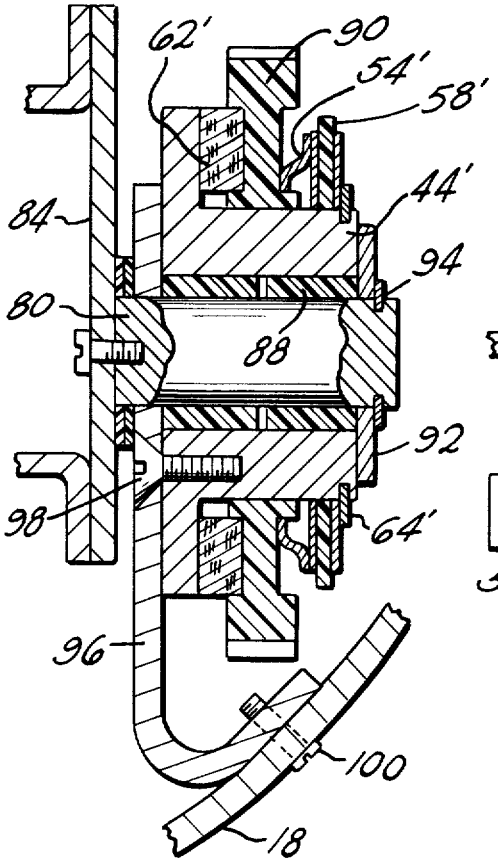
FIG. 3 is a detail, enlarged, elevational sectional view taken through the drive gear mounted upon the horizontal axis along Section III—III of FIG. 1.

The shaft 80 is of a cylindrical configuration and includes an outer bearing surface upon which the synthetic plastic sleeve bearing 88 is mounted. The bearing 88 rotatably supports a gear 90 which is mounted upon a hub member similar to that previously described and shown in FIG. 4, and as the hub and components associated with the gear 90 are similar to those previously described with respect to gear 52, similar components are indicated in FIG. 3 by primes. Thus, the gear 90 is frictionally mounted upon the hub 44' for rotation therewith under normal operating conditions and relative rotation between the gear 90 and hub 44' can occur when the frictional resistance of the clutch components is overcome. The hub 44' is maintained upon the shaft 80 by a washer 92 backed by a split ring 94 received within a groove within the shaft, and the hub 44' is affixed to the lamp housing bracket 96 by screws 98. The bracket 96 is attached to the lamp housing 18 by screws 100.

At the opposite side of the lamp housing the stub shaft 82 rotatably supports a bracket 102 which is of a configuration similar to the bracket 96, and this bracket is attached to the lamp housing in the same manner.

The electric motor 66 is mounted in a horizontal manner whereby the output shaft 74 is horizontally disposed and the pinion gear 76 engages the gear 90 as will be apparent in FIG. 1. Thus, upon rotation of the pinion gear 76 the gear 90 will be rotated to produce the vertical adjustment and rotation of the housing 18 about the axis of shafts 80 and 82.

In order to absorb vibrations imposed upon the lamp from either external or internal sources friction producing brake means are utilized with both axes of adjustment. As will be apparent in FIG. 4, the upper portion of the shaft 16 extends above the upper support member plate 40 and this portion of the shaft is circumscribed by a pair of split straps 106 of a general U-configuration interconnected by bolts 108 and connected to the support 35 by a bracket 104. A friction material, such as cork 110, is interposed between the straps and the shaft 16, and as the straps 106 are affixed to the support member 38 the "grip" of the cork 110 upon the shaft will produce a predetermined resistance to rotation of the support member about the shaft 16.

Figure 5:
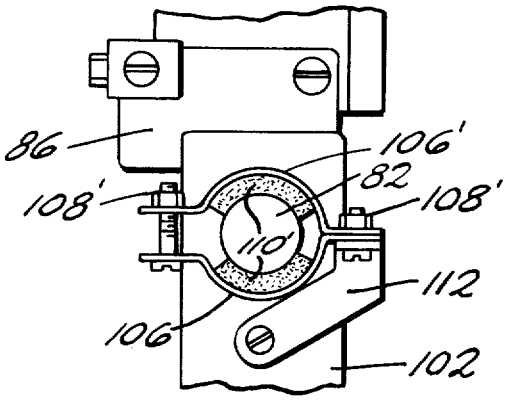
FIG. 5 is a detail, elevational view of the friction brake mechanism mounted upon the horizontal axis as taken along Section V—V of FIG. 2.
Figure 6:
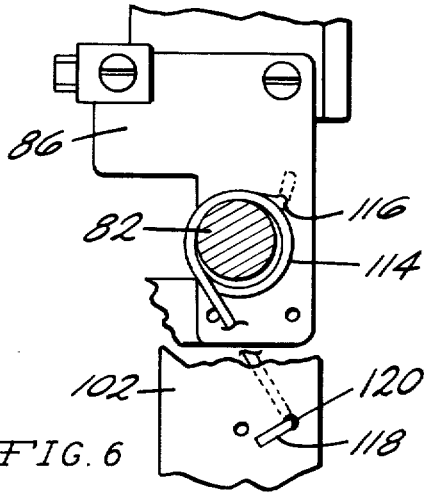
FIG. 6 is an enlarged, detail, elevational sectional view illustrating the torsion counterbalance spring as taken along Sections VI—VI of FIG. 2, FIGS. 7 and 8 are plan sectional views illustrating the stop mechanism at the two locations of travel limit as taken along Section VII—VII of FIG. 2.

A similar type of brake and vibration-dampening component is shown in FIG. 5 which is associated with a support member stub shaft 82. Components similar to those previously described are indicated by primed reference numerals, and the straps 106' are connected to the lamp housing bracket 102 to prevent relative rotation thereto by a bracket 112.

In that only the lamp housing 18 and lamp rotate about the horizontal axis defined by the shafts 80 and 82, the greatest weight of the lamp housing exists toward the "front" of the lamp due to the presence of the sealed beam unit 24. In order to overcome this unbalance a torsion spring 114 is wound about the shaft 82 having an end 116 connected to the support member plate 86, and an end 118 inserted through a hole 120 defined in the housing bracket 102. The spring 114 produces a biasing torque on the bracket 102 tending to pivot the housing 18 upwardly to overcome the unbalance. In this manner the presence of the spring 114 produces a more uniform operation of vertical adjustment, and minimizes forces imposed upon the gear 90 and the motor 66.

A gear guard 122 is affixed to the support 38 extending about the portion of the gear 52 disposed toward the lamp 24. The purpose of this guard is to prevent engagement of the boot 32 with the gear when the housing 18 is tilted upwardly, and rotated in a horizontal direction. The guard will prevent abrasion of the boot due to engagement with the gear under such conditions.

Figure 7:
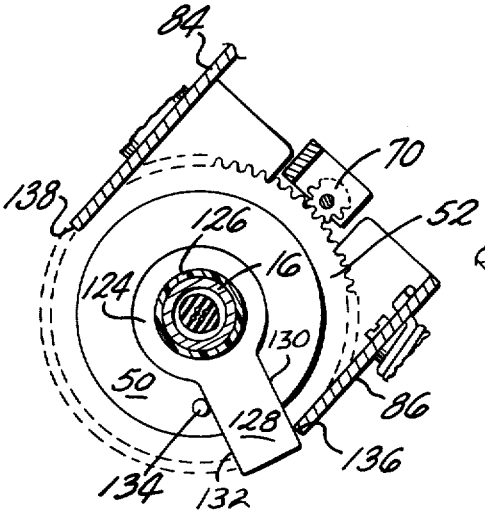
Figure 8:
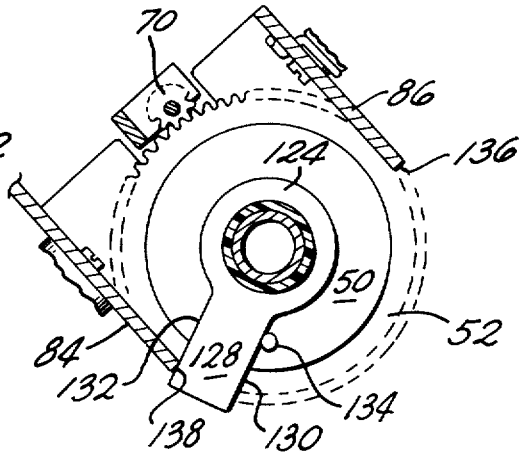

Rotation of the support member 38 about the shaft 16 is limited by stop structure located adjacent the hub flange 50. The stop structure includes a lever 124 rotatably mounted upon a bearing 126 disposed on the shaft 16, and the lever includes a radially extending portion 128, FIG. 7, of a rather substantial width defined by lateral edges 130 and 132. A stop pin 134 is mounted in the hub flange 50 extending upwardly therefrom in [axial alignment with] *the path of movement of* the lever portion 128, and the radial length of the lever portion 128 is sufficient to extend the portion for engagement with the ends 136 and 138 of the support member side plates as shown in FIGS. 7 and 8. Thus, as the housing support 38 rotates relative to the shaft 16 one of the ends 136 or 138 will engage the lever portion 128 and rotate the lever 124 in the same direction of movement about the shaft as the support is rotating under the influence of the motor 64. Movement of the support member in a clockwise direction is prevented when the relationship shown in FIG. 7 is achieved. In this relationship the support plate end 136 is engaging edge 130 of the lever portion 128 while the stop pin 134 is engaging the other. Upon rotating the support 38 in a counterclockwise direction, FIGS. 7 and 8, the plate end 138 will rotate until it engages the edge 132 of the lever portion 128 engaged by the stop in 134, FIG. 7, and then proceed to rotate the lever in a counterclockwise direction about the shaft 16. This counterclockwise rotation will continue until the relationship shown in FIG. 8 occurs. In this relationship the end 138 has rotated the lever portion 128 until the side 130 now engages the stop pin 134.

In the above-described stop mechanism, the angular displacement of the plate ends 136 and 138 with respect to the shaft 16, and the width of the lever arm portion 128, is such that approximately 380° of rotation of the support 38 is possible before the support member is restrained against further rotation about its vertical axis. As the conductors for the lamp and motors pass through the shaft 16, as is apparent from FIGS. 1 and 2, the 380° rotation prevents the conductor cord passing through the pedestal from being excessively twisted, and the requirement for conductor rings and brushes is eliminated, yet a significant degree of travel in a horizontal direction is permitted to accommodate most uses of the lamp. Of course, the pin 134 will be located in the hub flange 50 such that the limits of movement of the support member occur when the lamp is directed in the "rearward" direction.

Figure 10:
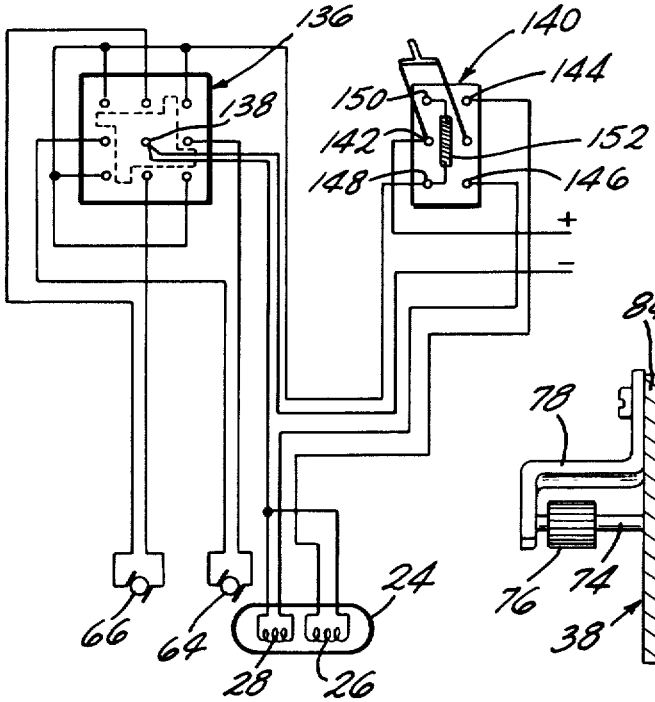
FIG. 10 is a diagram of the control circuit used with the lamp of the invention.
Figure 9:
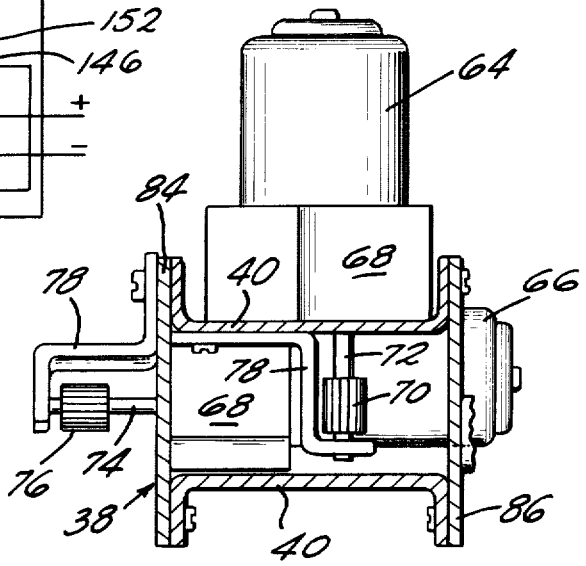
FIG. 9 is a sectional view taken through the support member along Section IX—IX of FIG. 1.

The circuit for controlling the lamp components is illustrated in FIG. 10. The circuit includes a "four-way" switch 136, which is preferably of the single actuator type whereby the switch lever or actuator 138 may be moved up, down, and to the right and left. The wiring to the motors 64 and 66 is such that movement of the actuator in an upward direction energizes the motor 66 to rotate the gear 90 in a counterclockwise direction, FIG. 1, to raise the elevation of the light beam. Likewise, movement of the switch actuator 138 down reverses the direction of the motor producing a clockwise rotation, FIG. 1, of the gear 90. When the actuator 136 is moved to the right the motor 64 is energized to rotate the support 38 about the gear 52 in a clockwise direction, and movement of the switch actuator to the left, produces a counterclockwise rotation of the housing support relative to the shaft 16 and the gear 52.

The switch for controlling the lamp filaments is indicated at 140 and includes a common terminal 142 attached to the power supply. The common terminal 142 is selectively connected by the actuator of the switch 140 to the spotlight terminal 144, or the floodlight terminal 146 or positioned in a central "off" condition. When the floodlight terminal 146 is energized the electric energy is supplied to the filament 28 and also the motors 64 and 66 directly in that terminal 142 is connected directly to the motor supply terminal 148. However, when the switch actuator is moved to energize the spotlight filament 26 by connecting 142 to 144, the current supplied to the electric motors passes from terminal 142 to terminal 150 through the resistor 152 which reduces the potential of the voltage supplied to the electric motors and reduces their rate of rotaton and, hence, the speed at which the motors 64 and 66 rotate the lamp housing about the vertical and horizontal axes. This "slowing" of the lamp movement rate when the spotlight filament is energized is desirable in that a finer adjustment of the lamp beam is possible, minimizing "hunting" and "overtravel".

The friction clutch connection of the gear 52 to the shaft 16, and the gear 90 to the housing 18, prevents damage to the drive mechanism if the lamp housing 18 should be turned or raised or lowered directly, either purposefully or accidentally. When the lamp housing 18 is manually turned in a horizontal direction the gear 52 will turn with the support 38 and thereby prevent excessive forces being imposed upon the pinion on shaft 72. Likewise, if the housing 18 is manually pivoted about the horizontal axis the gear 90 remains stationary while the associated friction clutch will prevent undue force being imposed upon the pinion gear on shaft 74. This feature does permit the lamp to be manually adjusted, and in the event of heavy icing conditions, or should an obstruction prevent the lamp housing from being rotated by the motors, the motors will not overheat or be otherwise overstressed. In the event of heavy icing conditions the housing 18 may be rotated manually to break free the restraining ice, and thus permit the drive mechanism to function in the usual manner.

The arcuate configuration 20 of the housing 18 permits clearance of the housing as it rotates vertically relative to the motor 64, and permits the housing to be of a minimum dimension configuration, and the concise relationship of the operating components result in a motor controlled lamp substantially smaller than previous devices.

As previously described, the lamp 24 incorporates both a spotlight filament 26 and a floodlight filament in a common unit. The spotlight filament 26 is of a more concise dimension than the floodlight filament 28, and is located at the focal point of the lamp reflector 27 to produce the narrow spotlight beam desired. The flood light filament 28 is located slightly offset with respect to the focal point to produce a dispersed light pattern.

It is appeciated that various modifications may be apparent to those skilled in the art without departing from the scope of the invention.

We claim:

1. An electric motor-controlled lamp characterized by its compact size, streamlined and unitary appearance and concise relationship of components comprising, in combination, a pedestal support having an *unsupported free* end, an enclosed, hollow lamp housing having an opening defined therein, said pedestal end extending into the interior of said housing through said opening, a first gear connected to said pedestal at said end thereof within said housing having a first axis, a support member rotatably mounted upon said pedestal end adapted to rotate about said first axis, pivot means pivotally supporting said housing upon said support member for oscillation about a second axis perpendicularly disposed to said first axis, a second gear connected to, and within, said housing concentrically disposed about said second axis, first electric motor drive means mounted upon said support member within said housing in operative engagement with said first gear, second electric motor drive means mounted upon said support member within said housing *adjacent said first motor drive means* in operative engagement with said second gear, a lamp mounted upon said housing and control means associated with said electric motor drive means.

2. In an electric motor-controlled lamp as in claim 1, a first friction clutch connecting said first gear to said pedestal, a second friction clutch connecting said second gear to said housing, each of said friction clutches including predetermined friction producing means to frictionally connect said clutches to its associated gear.

3. In an electric motor-controlled lamp as in claim 1, a first friction brake interposed between said support member and said pedestal braking rotation of said support member about said first axis, and a second friction brake interposed between said housing and said support member braking rotation of said housing about said second axis, said friction brakes dampening vibrations occurring between the relatively rotating components thereof.

4. In an electric motor-controlled lamp as in claim 1, a stop lever pivotally mounted for rotation about said first axis, first and second stops defined on said support member in radial alignment with said lever, said stops being angularly displaced from each other with respect to said first axis and a third stop fixed with respect to said pedestal in radial alignment with said lever whereby said stops limit rotation of said support member relative to said pedestal about said first axis and the angular spacing of said first and second stops permits rotation of said support member about said first axis through more than 360°.

5. In an electric motor-controlled lamp as in claim 1, a torsion spring mounted on said support member disposed about said second axis having an end connected to said housing and imposing a biasing force on said housing tending to pivot said housing about said second axis and counterbalance said housing.

6. An electric motor-controlled lamp comprising in combination, a pedestal having a longitudinal axis and an *unsupported free* end, gear support means affixed to said pedestal axially extending from and beyond said end, a first gear mounted upon said gear support means having an axis [substantially parallel] *coaxial with* said pedestal axis, a support member rotatably circumscribing said support means interposed between said first gear and pedestal end and rotatable in a plane substantially perpendicular to said pedestal axis, a hollow lamp housing, means mounting said hollow lamp housing upon said support member for pivotal movement about an axis substantially perpendicular to the axis of rotation of said first gear, a second gear within and connected to said housing concentric to said housing pivot axis, first electric motor and speed reduction drive means mounted upon said support member within said housing having a pinion gear in operative engagement with said first gear, second electric motor and speed reduction drive means mounted upon said support member within said housing *and adjacent said first motor and drive means* having a pinion gear in operative engagement with said second gear, an electric lamp mounted upon said housing and control means associated with said drive means.

7. In an electric motor-controlled lamp as in claim 6, a first friction clutch connecting said first gear to said pedestal, a second friction clutch connecting said second gear to said housing, each of said friction clutches including predetermined frictional force producing means to frictionally connect said clutches to its associated gear.

8. In an electric motor-controlled lamp as in claim 6, a first friction brake interposed between said support member and said pedestal braking rotation of said support member about said first axis, and a second friction brake interposed between said housing and said support member braking rotation of said housing about said second axis, said friction brakes dampening vibrations occurring between the relatively rotating components thereof.

9. In an electric motor-controlled lamp as in claim 6, a stop lever pivotally mounted for rotation about said first axis, first and second stops defined on said support member [in axial alignment with] *radially outward of said first axis and in the path of* said lever, said stops being angularly displaced from each other with respect to said first axis and a third stop fixed with respect to said pedestal [in axial with] *radially outward of said first axis and in the path of* said lever whereby said stops limit rotation of said support member relative to said pedestal about said first axis and the angular spacing of said first and second stops permits rotation of said support member about said first axis through more than 360°.

10. An electric motor-controlled lamp comprising, in combination, a lamp supporting pedestal, an electric lamp mounted upon said pedestal, pivot means mounting said lamp on said pedestal for movement in a horizontal plane and in a vertical plane, a floodlight filament within said lamp, a spotlight filament within said lamp, variable speed electric motor means connected to said lamp for pivoting said lamp in said horizontal and vertical planes, switch means connected to said electric motors and switch means selectively controlling said filaments, said control means including a resistor selectively connected in series with said electric motors and said switch operating said spotlight filament whereby a reduced voltage is supplied to said motors upon energizing said spotlight filament.

* * * * *